United States Patent
Barthel

(10) Patent No.: US 10,999,723 B2
(45) Date of Patent: May 4, 2021

(54) MEASUREMENT APPARATUS, MEASUREMENT SYSTEM AND METHOD FOR TRANSFERRING DATA BETWEEN A MEASUREMENT APPARATUS AND A PORTABLE DEVICE

(71) Applicant: Rohde & Schwarz GmbH & Co. KG, Munich (DE)

(72) Inventor: Sven Barthel, Chemnitz (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 0 days.

(21) Appl. No.: 16/396,964

(22) Filed: Apr. 29, 2019

(65) Prior Publication Data
US 2020/0344585 A1 Oct. 29, 2020

(51) Int. Cl.
*G08B 5/36* (2006.01)
*H04W 4/80* (2018.01)
*G08C 19/00* (2006.01)

(52) U.S. Cl.
CPC ............... *H04W 4/80* (2018.02); *G08B 5/36* (2013.01); *G08C 19/00* (2013.01)

(58) Field of Classification Search
CPC .................................. H04W 4/80; G08C 19/00
See application file for complete search history.

(56) References Cited

U.S. PATENT DOCUMENTS

| | | | | |
|---|---|---|---|---|
| 3,792,351 | A * | 2/1974 | Ireland | G01R 23/00 324/76.51 |
| 7,268,688 | B2 * | 9/2007 | Juds | G08B 13/24 235/439 |
| 7,769,345 | B2 * | 8/2010 | Johnson | G06K 9/228 235/462.2 |
| 8,929,810 | B2 * | 1/2015 | Frankland | H04B 5/00 455/41.1 |
| 2012/0094596 | A1 * | 4/2012 | Tysowski | G06Q 10/10 455/41.1 |
| 2013/0084801 | A1 * | 4/2013 | Royston | H04B 5/0043 455/41.1 |
| 2013/0281014 | A1 * | 10/2013 | Frankland | H04B 5/00 455/41.1 |
| 2014/0368318 | A1 * | 12/2014 | Paris, Jr. | G06K 7/10009 340/10.1 |
| 2016/0025784 | A1 * | 1/2016 | Ripp | G01R 1/04 324/555 |
| 2016/0027331 | A1 * | 1/2016 | Ding | H04W 4/023 434/187 |

(Continued)

FOREIGN PATENT DOCUMENTS

EP 3 315 977 A1 5/2018

*Primary Examiner* — Hai Phan
*Assistant Examiner* — Son M Tang
(74) *Attorney, Agent, or Firm* — Westman, Champlin & Koehler, P.A.

(57) ABSTRACT

The present invention relates to a measurement apparatus, comprising a measurement unit configured to at least one of receive and transmit a measurement signal; a shield configured to electrically shield said measurement unit; at least one close range communication interface configured to transfer data to an external portable device; and at least one indicator which indicates a connection region for connecting said external portable device to said at least one close range communication interface.

10 Claims, 3 Drawing Sheets

(56) References Cited

U.S. PATENT DOCUMENTS

| | | | |
|---|---|---|---|
| 2016/0165056 A1* | 6/2016 | Bargetzi | G06F 3/04842 455/416 |
| 2017/0095208 A1* | 4/2017 | Oberleitner | A61B 5/0002 |
| 2017/0235919 A1* | 8/2017 | Bauss | G16H 20/17 705/2 |
| 2017/0307678 A1* | 10/2017 | Diegmann | G01R 13/0218 |
| 2018/0121113 A1 | 5/2018 | Guenther | |

* cited by examiner

MEASUREMENT APPARATUS, MEASUREMENT SYSTEM AND METHOD FOR TRANSFERRING DATA BETWEEN A MEASUREMENT APPARATUS AND A PORTABLE DEVICE

TECHNICAL FIELD

The present invention relates to a measurement apparatus to be coupled to an external portable device, a measurement system comprising a measurement apparatus and a portable device, and to a method for transferring data between a measurement apparatus and a portable device.

BACKGROUND

Measurement devices comprise instruments for receiving and processing data, examples being oscilloscopes, network analyzers, logic analyzers, and spectrum analyzers. Measurement devices such as signal generators or arbitrary waveform generators, AWG, may also be used for providing electrical signals used in measurement processes. For instance, measurement signals may be applied to a device under test, DUT, in a laboratory or in a production facility for measuring the response of the device under test for identifying specific properties or for detecting errors of the device under test. The frequency response of the device under test can be measured and characteristic parameters, such as amplitudes and phases, can be displayed to a user.

Often, measurement protocols must be generated, an exemplary measurement arrangement being known from US 2017/0307678 A1. As described in EP 3 315 977 A1, data can be stored on an external memory device, such as a USB device by coupling the external memory device to the measurement apparatus. Further, the measurement apparatus may be connected to an external mobile device and report data may be transmitted automatically via a wireless link if it is detected that the mobile device is in a vicinity of the measurement apparatus, as known from US 2016/0027331 A1.

The measurement circuitry of a measurement apparatus is often highly sensitive to high frequency signals. Accordingly, a high frequency shield may be provided to shield the measurement circuitry from external high frequency interference signals, as described in US 2016/0025784 A1.

In particular unexperienced users may still consider transferring data from a measurement apparatus to an external portable device to be inconvenient, making it desirable to find simpler solutions for coupling the external portable device to a measurement apparatus.

SUMMARY

The present invention solves this problem by the features of the independent claims. Further embodiments are subject matter of the dependent claims.

According to a first aspect, the invention provides a measurement apparatus, comprising a measurement unit for receiving and/or transmitting a measurement signal. The measurement apparatus further comprises a shield for electrically shielding the measurement unit. The measurement apparatus further comprises at least one close range communication interface for transferring data to an external portable device, and at least one indicator which indicates a connection region for connecting the external portable device to the at least one close range communication interface.

According to a second aspect, a measurement system is provided which comprises a portable device comprising a first close range communication interface for receiving data. The measurement system further comprises a measurement apparatus with a measurement unit for receiving and/or transmitting a measurement signal, a shield for electrically shielding the measurement unit, a second close range communication interface for transferring data to the portable device, and at least one indicator which indicates a connection region for connecting the first close range communication interface of the portable device to the second close range communication interface of the measurement apparatus.

According to a third aspect, the invention provides a method for transferring data between a measurement apparatus and a portable device, wherein a measurement signal is generated by a measurement unit of a measurement apparatus. The measurement unit is electrically shielded by a shield of the measurement apparatus. A portable device is moved into a connection region of at least one close range communication interface of the measurement apparatus, wherein at least one indicator indicates the connection region. Data is transferred via the at least one close range communication interface to the portable device.

The invention proposes to protect the measurement unit by a shield for reducing disturbances caused by data transfer from the measurement apparatus to the external portable device. Moreover, the user may conveniently couple the external device to the measurement apparatus using the close range communication interface by simply bringing the external portable device into the connection region indicated by the at least one indicator.

The close range communication interface of the measurement apparatus or of the external portable device may comprise at least one of a near field communication network (NFC network), a Bluetooth connection, a Bluetooth low energy connection or a ZigBee connection. The measurement apparatus and the external portable device may also communicate over a Wifi connection.

The indicator may comprise a label or marker such as a colored arrow, a word or text, or a symbol highlighting the region for coupling the external portable device and the measurement apparatus. Close range communication over the at least one close range communication interface can reduce the required user interaction which makes transferring data from the measurement apparatus to an external portable device more convenient.

According to a preferred embodiment of the measurement apparatus, the external portable device to be coupled to the at least one close range communication interface may be a cell phone, a laptop or any portable computing device. The external portable device may comprise a display adapted to display the information transferred from the measurement apparatus via the at least one close range communication interface. The measurement apparatus may be adapted to transfer a control signal via the at least one close range communication interface which automatically displays information on the display of the external portable device after transferring.

According to a preferred embodiment the measurement apparatus comprises a housing which houses the measurement unit and the close range communication interface. The housing may comprise the indicator. The indicator may be a label or marker attached to the housing or may be imprinted or engraved. The indicator may instruct the user to bring the external portable device into physical contact with the at least one closed range communication interface. For example, the user may mount the external portable device in a mounting rack or may put down the external portable device on a surface marked by the indicator.

According to a preferred embodiment of the measurement apparatus, the housing at least partially comprises the shield. The shield may be an additional element which surrounds the measurement unit and may optionally surround additional components of the measurement apparatus. The shield as additional element may be firmly mounted inside the housing. Also, structural elements of the housing may at least partially form the shield. For example, the shield may be formed by sidewalls of the housing together with a separating wall inside the housing, thus forming a compartment inside the housing which contains at least the measurement unit of the measurement apparatus.

According to a further embodiment, the measurement apparatus comprises a proximity sensor adapted to detect proximity of the external portable device. If proximity of the external portable device is detected, at least one close range communication interface is activated. The proximity sensor may comprise optical sensors, such as photodiodes, which transmit a detection signal if the light conditions change due to the presence of external objects. The proximity sensor may also comprise electromagnetic sensors, such as Hall effect sensors for detecting the presence of electronic components. The proximity sensor may be adapted to measure certain physical or chemical quantities and to transmit a detection signal indicating the presence or proximity of an external portable device if the value of the measured quantity exceeds a certain predefined threshold. The proximity sensor may also comprise a mechanically sensor, such as a switch which detects proximity of the external portable device after bringing the external portable device into physical contact with the measurement apparatus. An advantage of a proximity sensor is that the close range communication interface of the measurement apparatus may be deactivated unless proximity of an external portable device is detected. Therefore, possible interferences between the close range communication interface and the measurement unit are avoided.

According to a preferred embodiment of the measurement apparatus, data transfer to the external portable device is automatically initiated after detecting proximity of the external portable device. The required interaction of the user is minimized to the extent that the user simply needs to bring the external portable device into the connection region to automatically initiate the data transfer. For example, if the user likes to obtain a screenshot of a plot or of information displayed on a display of the measurement apparatus, the user may simply bring the external portable device in a dedicated connection region which the indicator marks as "screenshot region" for obtaining the required screenshot. It is not necessary that the user navigates to a certain directory containing the information which may be a time-consuming task if the measurement apparatus is part of a pool of a university or large company with many users having access to the measurement apparatus.

According to a preferred embodiment of the measurement apparatus, the proximity sensor may itself comprise a close range communication interface. For example, the proximity sensor may comprise a near field communication interface (NFC interface). After the measurement apparatus identifies the external portable device using the NFC interface, data is transferred via a Bluetooth connection between the close range communication interfaces of the measurement apparatus and the external portable device. An advantage is the higher range and data rate of Bluetooth as compared to NFC communication. If NFC communication is only used for identification, the external portable device may be farther away from the measurement apparatus during the transmission of data over the Bluetooth connection.

According to a preferred embodiment of the measurement apparatus, the measurement apparatus further comprises a data providing unit for generating measurement data based on the measurement signal. The data providing unit transfers the measurement data to the external portable device via the at least one close range communication interface. The measurement data may comprise data regarding the frequency response of a device under test being tested by the measurement unit, such as amplitudes and phases as functions of the test frequency.

According to a preferred embodiment of the measurement apparatus, the data providing unit further generates parameter data to be transferred to the external portable device. The parameter data relates to data which is provided to the measurement unit and/or which is used by the measurement unit during a measurement process. The parameter data may comprise the values of parameters configured by a user of the measurement apparatus, such as sampling rates, voltages, current ranges, input types, probes used on the inputs, display settings, units, axis values, trigger levels, marker values, mathematical formulas, signal enumerator settings, and the like. The parameter data may further comprise reference waveforms, especially digital waveforms, bus waveforms, analog waveforms or the like.

According to a preferred embodiment of the measurement apparatus, the data providing unit further provides measurement unit related data to the external portable device via the at least one close range communication interface. The measurement unit related data may comprise all or some of the present configuration parameters of the measurement unit.

According to a further embodiment of the measurement apparatus, the data providing unit is further configured to generate the measurement data based on configuration data received from the external portable device via the at least one close range communication interface. The obtained configuration data may specify which data is to be obtained by the external portable device. For example, the configuration data may comprise information about a user of the specific external portable device. In security-relevant situations, some information is only transferred to users having a specific security level. Moreover, different users may need different type of information because not all of the information is relevant for them. Without further interactions of the user, customized information is provided to the external portable device.

According to a further embodiment of the measurement apparatus, a plurality of indicators is provided, each indicator corresponding to different connection regions for connecting the external portable device to the same close range communication interface. The different connection regions may be of different types. For instance, one of the connection regions may correspond to a rack mount adapted to receive the external portable device and another of the connection regions may correspond to an area surrounding the measurement apparatus such that the measurement apparatus and the external portable device may communicate via a corresponding close range communication interface if the external portable device is brought into said area.

According to a preferred embodiment of the measurement apparatus, each indicator may indicate a separate connection region relating to a separate close range communication interface. For example, the measurement apparatus may have two or more close range communication interface at different locations, e.g. on a side surface and on a top surface of the measurement apparatus. Each close range communication interface is labeled by a respective indicator.

According to a preferred embodiment of the measurement apparatus, the close range communication interface and the measurement unit are adapted to operate at different frequency ranges. In particular, the frequency ranges are chosen in such a way that communication between the measurement apparatus and the external portable device does not interfere with measurements performed by the measurement unit. The choice of the frequency ranges may also take the effect of the shield into account. In presence of a sufficient shield, the frequency ranges of the close range communication interface and the measurement unit may lie close together and, in some cases, may even overlap. Generally, close range communication at low power and at low frequencies is preferred.

According to a preferred embodiment of the measurement apparatus, the shield is at least partially made of shielding material such as metal. The sheet may be specifically designed for shielding the measurement unit against high-frequency interferences. The shield may suppress signals in certain frequency ranges and power ranges, such as typical for standard wireless communication networks, such as LTE.

According to a preferred embodiment of the measurement system, the portable device automatically transfers output data to an external device. The output data is generated based on the data received from the measurement apparatus via the first close range communication interface. For example, the portable device may be connected to a network and may upload the output data to a server of the network. The output data may also be directly transferred to another external device. A user of the portable device may select the destination of the output data. By automatically transferring output data to the external device, the user may easily receive technical support without the requirement of any further actions. By directly transferring the information, quality loss can be avoided as compared to a user sending a photograph of the screenshot made with his cell phone. Moreover, the user only uses the communication paths of the system itself and is not tempted to use external services, such as external mail providers, which may pose a security risk.

According to a further embodiment of the method, output data is automatically transferred from the portable device to an external device. The output data is generated based on the data received from the measurement apparatus via the first close range communication.

According to a further embodiment of the method, a proximity sensor of the measurement apparatus detects proximity of the portable device and automatically activates the at least one close-range communication interface upon detecting proximity of the portable device.

BRIEF DESCRIPTION OF THE DRAWINGS

For a more complete understanding of the present invention and advantages thereof, reference is now made to the following description taken in conjunction with the accompanying drawings. The invention is explained in more detail below using exemplary embodiments which are specified in the schematic figures of the drawings, in which.

Figure 1:
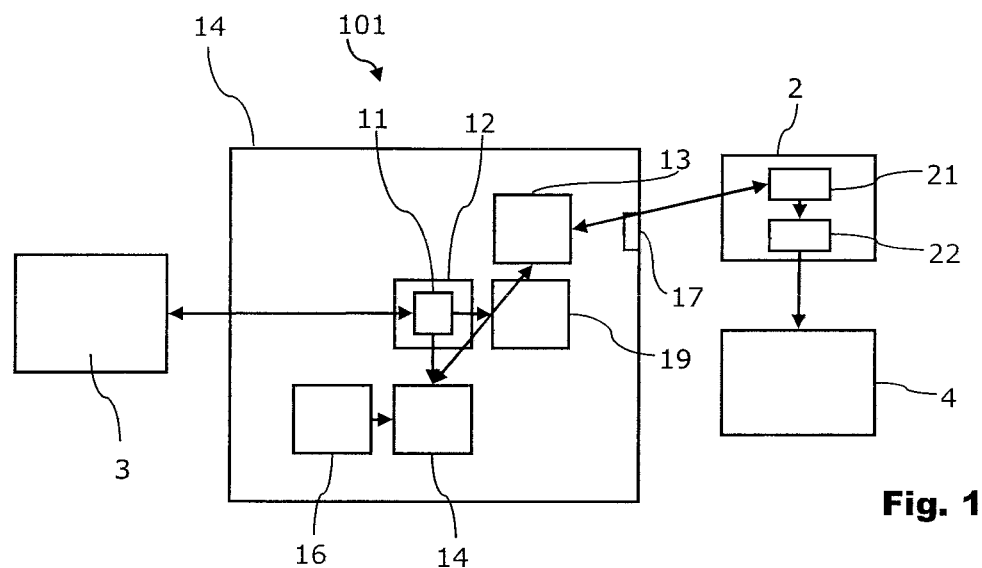
FIG. 1 shows a schematic block diagram of a measurement apparatus according to a first embodiment of the invention.

The appended drawings are intended to provide further understanding of the embodiments of the invention. They illustrate embodiments and, in conjunction with the description, help to explain principles and concepts of the invention. Other embodiments and many of the advantages mentioned become apparent in view of the drawings. The elements in the drawings are not necessarily shown to scale.

In the drawings, like, functionally equivalent and identically operating elements, features and components are provided with like reference signs in each case, unless stated otherwise.

DETAILED DESCRIPTION OF THE DRAWINGS

FIG. 1 shows a schematic block diagram of a measurement apparatus 101 which comprises a measurement unit 11 which can receive and/or transmit a measurement signal. The measurement apparatus 101 can be an oscilloscope, a spectrum analyzer, a signal analyzer, a logic analyzer, a network analyzer, a signal generator, an arbitrary waveform generator and/or a testing device. The measurement apparatus 101 can be used in a production process for testing produced components or devices. The measurement apparatus 101 may also be used in a training laboratory for testing devices under test. The measurement unit 11 may be adapted to generate an output signal, such as a high-frequency signal. A frequency of the output signal may change over time and the frequency response of a device under test 3 being coupled to the measurement unit 11 can be determined by the measurement unit 11 based on an input signal received from the device under test 3 in response to the output signal. The device under test 3 may be a printed circuit board comprising a plurality of electronic components, e.g. discrete components such as coils or capacitors as well as integrated components such as microprocessors or ASICs. The measurement unit 11 may further comprise a computing device, such as at least one microprocessor, for generating output to be displayed on a display 19 of the measurement apparatus 101. The display 19 may comprise a touch screen. For example, a bode plot may be displayed, comprising a bode magnitude plot which expresses the magnitude of the frequency response as a function of the frequency of the output signal, and a bode phase plot which expresses the corresponding phase shift as a function of the frequency of the output signal. Additional information, comprising configuration data of the measurement unit 11 or information regarding the device under test 3 may be displayed on the display 19.

The measurement apparatus 101 can be coupled with an external portable device 2 which can be a smartphone, a laptop computer, a tablet computer, a smartwatch or an ID card of a user. The external portable device 2 has a first close range communication interface 21 and the measurement apparatus 101 comprises a second close range communication interface 13 which is configured to transfer data to the first close range communication interface 21 of the external portable device 2. The first and second close range communication interfaces 21, 13 can be wireless transceivers adapted to provide wireless near field communication, NFC, between the measurement apparatus 101 and the external portable device 2. The first and second close range communication interfaces 21, 13 may provide an NFC connection, a Bluetooth connection, a Bluetooth low energy connection or a ZigBee connection. It is to be understood that the close range communication interfaces 21, 13 may comprise a plurality of single units, like hardware interfaces, communication controllers, processors and the like.

The measurement apparatus 101 further comprises a data providing unit 14 which is adapted to provide the data to be transferred over the second close range communication interface 13 to the first close range communication interface 21. The data providing unit 14 may generate measurement data based on measurements performed by the measurement unit 11. Possible data may relate to the frequency response of the device under test 3 and may comprise functions or tables describing the amplitude or phase shift as a function of frequency. The data may particularly comprise signal data, such as waveform data or a screenshot of the display 19.

Further, the data providing unit 14 is connected to a memory 16 of the measurement apparatus 101 which stores information regarding the configuration or settings of the measurement unit 11. The memory 16 may be a volatile or non-volatile data memory, e.g. a solid-state disk, memory cards or the like. Details regarding the measurement process, such as parameters regarding the measurement signal, tested frequency ranges, voltages or other measurement characteristics may be stored in the memory 16 and can be part of the data transmitted to the external portable device 2. Moreover, the memory 16 may store additional data related to the measurement unit 11, such as an IP address, user data, software license codes, calibration status or service reports. The data may further comprise a serial number of the measurement apparatus 101, a production date of the measurement apparatus 101 or data indicating the specific type of the measurement apparatus 101. Some or all of the data may be stored in the memory 16 after a request of the user of the measurement apparatus 101. Also, measurement data, such as screenshots may be saved in the memory 16. The measurement apparatus 101 may comprise a specific interface for generating screenshots, for example a dedicated button or an area on a touchscreen of the display 19.

In addition to receiving data, the first close range communication interface 21 of the external portable device 2 can also be adapted to transmit data to the second close range communication interface 13 of the measurement apparatus 101. Configuration data may be transmitted from the external portable device 2 to the measurement apparatus 101 which may comprise information regarding the characteristics of the external portable device 2 and/or identification information for identifying the external portable device 2 and/or information regarding the user of the external portable device 2. The data to be transmitted to the measurement apparatus 101 may also comprise requests for specific information to be transmitted to the external portable device 2. The data providing unit 14 may select the data to be transmitted to the external portable device 2 based on the data received from the external portable device 2. For example, a screenshot can be transmitted to the external portable device 2 having a resolution which fits the resolution of a display of the external portable device 2. This avoids unnecessary transmittal of data which cannot be processed by the external portable device 2. The data providing unit 14 may also restrict the data to be transmitted to the external portable device 2 based on the identity of the user. For example, different users may have access to different categories of information which may partially overlap.

The data providing unit 14 may further be adapted to encrypt the data to be transmitted to the external portable device 2, e.g. based on a user-defined password. The data providing unit 14 may encrypt the data taking the type of data to be transmitted into account and/or taking the identity of the user of the external portable device 2 and/or the identity of the external portable device 2 into account. The data providing unit 14 may comprise an encryption unit and the external portable device 2 may comprise a corresponding decryption unit for decrypting the received data.

The measurement apparatus 101 further comprises an indicator 17 which indicates a connection region for connecting the external portable device 2 to the measurement apparatus 101. The connection region corresponds to a certain spatial region around the second close range communication interface 13 of the measurement apparatus 101. If the external portable device 2 is moved into this spatial region, the first close range communication interface 21 of the external portable device 2 and the second close range communication interface 13 of the measurement apparatus 101 can be connected to each other and data can be transferred between the close range communication interfaces 13, 21. The indicator 17 may be applied to a housing 14 of the measurement apparatus which houses the measurement unit 11, the second close range communication unit 13, the data providing unit 14 and the memory 16. The indicator 17 can be a label or marker on the housing 14, such as a sign, word or text, e.g. a label saying "connection region". The indicator 17 may be a picture or icon of the external portable device 2, indicating an exact or approximate region where to put or hold the external portable device 2. The indicator 17 may also be a reference to the second close range communication interface 13 of the measurement apparatus 101, such as an NFC-icon or Bluetooth-icon.

The measurement unit 11 is at least partially shielded by a shield 12 of the measurement apparatus 101. The measurement unit 11 may shield the measurement unit 11 only in certain directions, e.g. in the direction of the connection region indicated by the indicator 17. The shield 12 may be a metal shield, in particular a high frequency shield for shielding the measurement unit 11 from electromagnetic disturbances. The shield 12 may also comprise at least one coating, such as a metal coating for shielding electromagnetic radiation. The shield 12 may be adapted to reduce electromagnetic radiation in a certain frequency range by at least a pre-defined percentage, such as at least by 50%, at least by 90% or at least by 99%.

A user of the external portable device 2 may be required to accept or decline transferring data from the measurement apparatus 101 to the external portable device 2. According to an embodiment, the output data is automatically transferred to the external device 2 after receiving the data from the measurement apparatus 101 without any further interaction of the user of the external portable device 2.

The external portable device 2 may further comprise a network interface 22 adapted to transfer output data to a further external device 4. The output data can be identical to the data received from the measurement apparatus 101 or may be some modified data generated based on the data received from the measurement apparatus 101. For example, the external portable device 2 may receive data from the measurement apparatus 101 via a Bluetooth connection and may transfer output data to the further external device 4 by email. The further external device 4 can be another portable device, such as a smartphone, a laptop computer, a tablet computer, a smartwatch or an ID card of a user. A further external device 4 can also be a server of a wireless network which may be adapted to further distribute the data or modified data generated based on the data received from the external portable device 22 to further devices, such as customer client devices. The further external device 4 may also be accessed by a technician or an expert which can give advice to the user of the external portable device 2 regarding the data received from the measurement apparatus 101. For example, if the measurement apparatus 101 has detected an error, the user of the external portable device 2 may automatically receive advice by simply bringing the external portable device 2 into the connection region of the measurement apparatus 101 without the need to take any further actions.

Successful transmission of data from the measurement apparatus 101 to the external portable device 2 may be signaled to the user, e.g. by an optical, acoustic or haptic signal. Additionally or alternatively, the communication between the first and second close range communication interfaces 13, 21 may be deactivated after successful transmission.

The measurement apparatus 101 and the external portable device 2 form a measurement system for transferring data. The further external device 4 and/or the device under test 3 may also be considered to be part of the measurement system.

Figure 2:
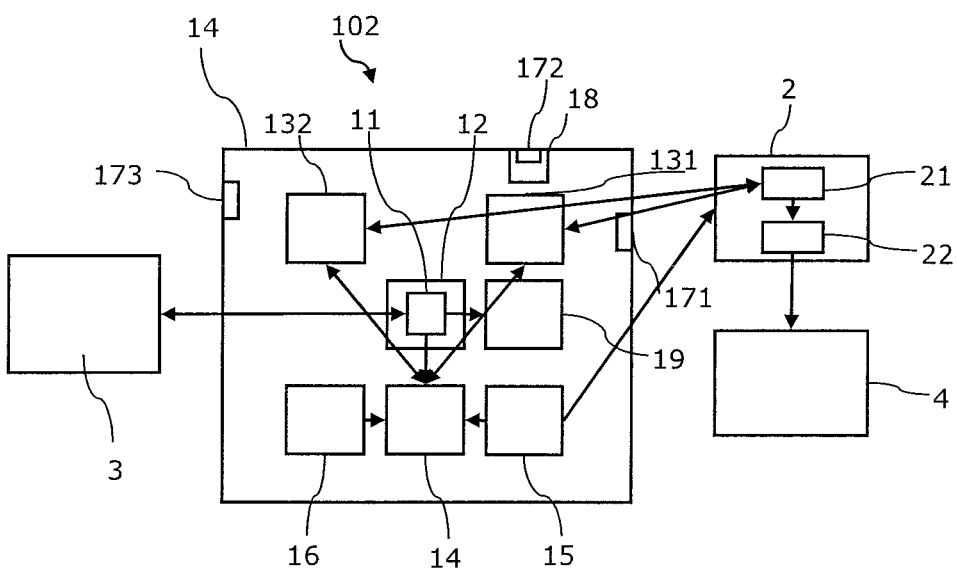
FIG. 2 shows a schematic block diagram of a measurement apparatus according to a second embodiment of the invention.

FIG. 2 shows a schematic block diagram of a measurement apparatus 102 which differs from the measurement apparatus 101 depicted in FIG. 1 in that two different second close range communication interfaces 131, 132 are provided for transferring data to the external portable device 2. A first indicator 171 indicates the position of a first one of the two second close range communication interfaces 131. The measurement apparatus 102 further comprises a mounting rack 18 adapted to receive the external portable device 2, said mounting rack 18 being indicated by a second indicator 172. After mounting the external portable device 2 in the mounting rack 18, data can be transferred from the first one of the two second close range communication interfaces 131 of the measurement apparatus 102 to the first close range communication interface 21 of the external portable device 2.

Moreover, a third indicator 173 is provided on the housing 14 of the measurement apparatus 102, indicating a connection region for connecting the external portable device 2 to the other of the two second close range communication interfaces 132.

Further, the measurement apparatus 102 comprises a proximity sensor 15 which is adapted to sense proximity of the external portable device 2. The proximity sensor 15 may be based on a physical or chemical detection principle, including at least one of capacitive proximity sensors, inductive proximity sensors, Hall effect sensors, and optical proximity sensors, including active or passive infrared sensors or photoelectric sensors such as photodiodes. In addition to passive elements, the proximity sensor 15 may also comprise active elements emitting electromagnetic radiation for detecting the presence of the external portable device 2. The proximity sensor 15 may further be based on a mechanical principle, such as a switch detecting the presence of a physical contact between the external portable device 2 and the measurement apparatus 101. A detection signal is transferred to the data providing unit 14. In response to the detection signal, the data providing unit 14 activates one or both of the second close range communication interfaces 131, 132. The data providing unit 14 may also be adapted to initiate automatic transfer data over both or one of the second close range communication interfaces 131, 132.

According to further embodiments, a separate proximity sensor 15 is provided for each of the second close range communication interfaces 131, 132. The proximity sensor 15 may detect the respective connection region and the data providing unit 14 may only activate the respective of the second close range communication interfaces 131, 132 or automatically transfer data over the respective of the second close range communication interfaces 131, 132. The measurement apparatus 102 may generally comprise any number of second close range communication interfaces 131, 132 and/or proximity sensors 15.

Figure 3:
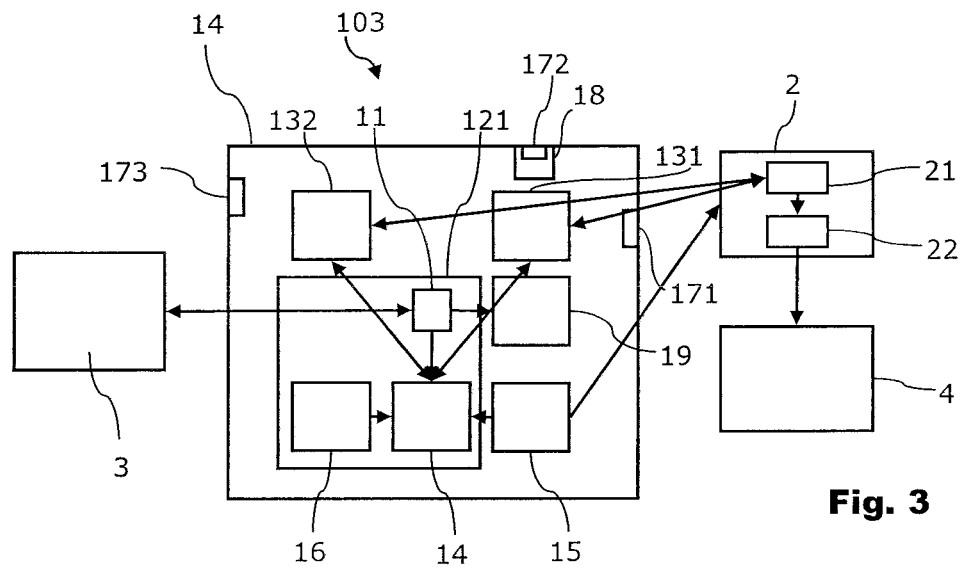
FIG. 3 shows a schematic block diagram of a measurement apparatus according to a third embodiment of the invention.

FIG. 3 shows a schematic block diagram of a measurement apparatus 103 which differs from the measurement apparatus 102 depicted in FIG. 2 in that a shield 121 is provided which also shields the memory 16 and the data providing unit 14 to further reduce possible disturbances.

Figure 4:
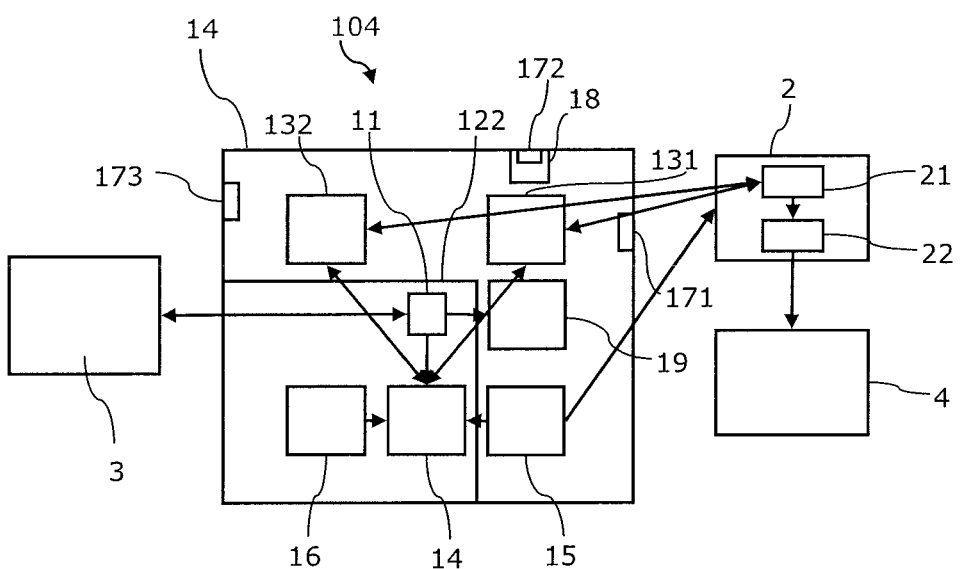
FIG. 4 shows a schematic block diagram of a measurement apparatus according to a forth embodiment of the invention.

FIG. 4 shows a schematic block diagram of a measurement apparatus 104 which differs from the measurement apparatus 103 depicted in FIG. 3 in that a shield 122 is at least partially formed by the housing 14 of the measurement apparatus 104. For example, the shield 122 for shielding the measurement unit 11, the data providing unit 14 and the memory 16 may be formed by sidewalls of the housing 14 in addition to sidewalls arranged inside the housing 14.

Figure 5:
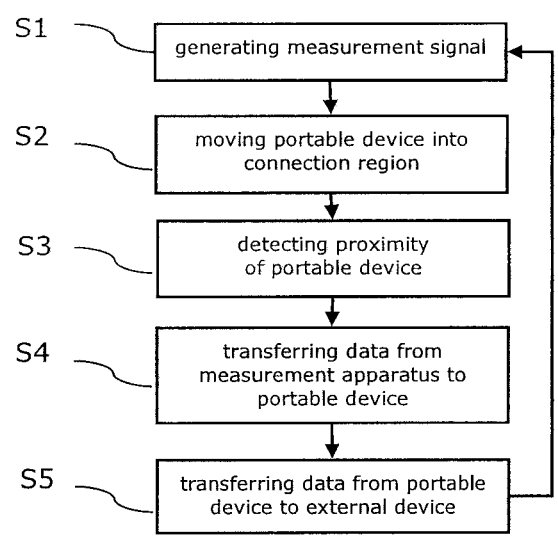
FIG. 5 shows a flow diagram illustrating a method transferring data between a measurement apparatus and a portable device according to an embodiment of the invention.

FIG. 5 shows a flow diagram of a method for transferring data between a measurement apparatus 101, 102, 103, 104 and a portable device 2. The measurement apparatus 101, 102, 103, 104 may be arranged according to any of the previously described embodiments of the measurement apparatus 101, 102, 103, 104.

In a first method step S1, a measurement unit 11 of the measurement apparatus 101, 102, 103, 104 generates a measurement signal and applies the measurement signal to a device under test 3. For example, electrical signal may be applied to the device under test 3 having a changing frequency. The device under test 3 responds to the measurement signal and the response is detected by the measurement unit 11. Data regarding the measurement performed by the measurement unit is stored. Further, a processing device of the measurement apparatus 101, 102, 103, 104, for example the data providing unit 14 described above, may process the data obtained during the measurement process. The processing device may be adapted to perform a spectrum analysis and may provide a bode plot.

In a second method step S2, a portable device 2 is moved into a connection region of a close range communication interface 13, 131, 132 of the measurement apparatus 101, 102, 103, 104. The connection region is indicated by at least one indicator 17, 171, 172 of the measurement apparatus 101, 102, 103, 104.

In a third method step S3, a proximity sensor 15 of the measurement apparatus 101, 102, 103, 104 detects proximity of the portable device 2. After detecting proximity of the portable device 2, the close range communication interface 13, 131, 132 is activated for allowing data transfer between the measurement apparatus 101, 102, 103, 104 and the portable device 2.

In a fourth method step S4, data is transferred from the measurement apparatus 101, 102, 103, 104 to the portable device 2. The portable device 2 comprises a close range communication interface 21 for coupling with the close range communication interface 13, 131, 132 of the measurement apparatus 101, 102, 103, 104. The close range communication interfaces 13, 131, 132 may provide an NFC connection or a Bluetooth connection.

In a fifth method step S5, output data is further transferred from the portable device 2 to a further external device 4. For example, output data may be generated by the portable device 2 based on the data received from the measurement apparatus 101, 102, 103, 104 and may be sent via a local area network, LAN, a wireless network or the internet to the further external device 4. A technician may have access to the further external device 4 and may help the user of the portable device 2 by providing information or instructions to the portable device 2. The external device 4 may also be adapted to further process the data. For example, the external device 4 may receive data from a plurality of measurement apparatuses 101, 102, 103, 104 and may combine the information.

Although specific embodiments have been illustrated and described herein, it will be appreciated by those of ordinary skill in the art that a variety of alternate and/or equivalent implementations exist. It should be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

In the foregoing detailed description, various features are grouped together in one or more examples or examples for the purpose of streamlining the disclosure. It is understood that the above description is intended to be illustrative, and not restrictive. It is intended to cover all alternatives, modifications and equivalents as may be included within the scope of the invention. Many other examples will be apparent to one skilled in the art upon reviewing the above specification.

Specific nomenclature used in the foregoing specification is used to provide a thorough understanding of the invention. However, it will be apparent to one skilled in the art in light of the specification provided herein that the specific details are not required in order to practice the invention. Thus, the foregoing descriptions of specific embodiments of the present invention are presented for purposes of illustration and description. They are not intended to be exhaustive or to limit the invention to the precise forms disclosed; obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. Throughout the specification, the terms "including" and "in which" are used as the plain-English equivalents of the respective terms "comprising" and "wherein," respectively. Moreover, the terms "first," "second," and "third," etc., are used merely as labels, and are not intended to impose numerical requirements on or to establish a certain ranking of importance of their objects.

The invention claimed is:

1. A measurement apparatus, comprising:
a measurement unit configured to at least one of receive and transmit a measurement signal for testing a device under test;
a shield configured to electrically shield said measurement unit;
a plurality of close range communication interfaces configured to transfer data to an external portable device, and comprising a close range communication interface arranged on a side surface of the measurement apparatus and a close range communication interface arranged on a top surface of the measurement apparatus;
a plurality of indicators, wherein each indicator indicates a separate connection region for connecting said external portable device to a separate close range communication interface of said plurality of close range communication interfaces;
a proximity sensor adapted to detect proximity of said external portable device and to activate said plurality of close range communication interfaces from a deactivated state after detecting proximity of said external portable device; and
a data providing unit configured to generate measurement data based on said measurement signal and to transfer said measurement data to said external portable device via one of said plurality of close range communication interfaces, wherein the measurement data comprises data related to a frequency response of the device under teat.

2. The measurement apparatus according to claim 1, further comprising a housing which houses said measurement unit and said plurality of close range communication interfaces, wherein the housing comprises said plurality of indictors.

3. The measurement apparatus according to claim 2, wherein said housing at least partially comprises said shield.

4. The measurement apparatus according to claim 1, wherein data transfer to said external portable device is automatically initiated after detecting proximity of said external portable device.

5. The measurement apparatus according to claim 1, wherein the data providing unit is further configured to provide measurement unit related data to said external portable device via one of said plurality of close range communication interfaces.

6. The measurement apparatus according to claim 1, wherein the data providing unit is further configured to generate said measurement data based on configuration data received from said external portable device via one of said plurality of close range communication interfaces.

7. A measurement system comprising:
a portable device comprising a first close range communication interface configured to receive data;
a measurement apparatus comprising a measurement unit configured to at least one of receive and transmit a measurement signal for testing a device under test; a shield configured to electrically shield said measurement unit; a plurality second close range communication interfaces configured to transfer data to said portable device, and comprising a close range communication interface arranged on a side surface of the measurement apparatus and a close range communication interface arranged on a top surface of the measurement apparatus; a plurality of indicators, wherein each indicator indicates a separate connection region for connecting said first close range communication interface of said portable device to a separate second close range communication interface of said plurality of second close range communication interfaces of the measurement apparatus; a proximity sensor adapted to detect proximity of said portable device and to activate said plurality of second close range communication interfaces from a deactivated state after detecting proximity of said portable device; and a data providing unit configured to generate measurement data based on said measurement signal and to transfer said measurement data to said external portable device via one of said plurality of second close range communication interfaces, wherein the measurement data comprises data related to a frequency response of the device under test.

8. The measurement system according to claim 7, wherein the portable device is adapted to automatically transfer output data to an external device, said output data being based on said data received from said measurement apparatus via said first close range communication interface.

9. A method for transferring data between a measurement apparatus and a portable device, comprising the steps:
detecting, by a proximity sensor of said measurement apparatus, proximity of said portable device, and automatically activating a plurality of close range communication interfaces from a deactivated state upon detecting proximity of said portable device, wherein the plurality of close range communication interfaces comprises a close range communication interface arranged on a side surface of the measurement apparatus and a close range communication interface arranged on a top surface of the measurement apparatus;
generating a measurement signal by a measurement unit of said measurement apparatus for testing a device under test, wherein said measurement unit is electrically shielded by a shield of said measurement apparatus;
moving said portable device into a connection region of one of said plurality of close range communication interfaces of said measurement apparatus, wherein each of a plurality of indicators indicates a separate connection region, wherein each separate connection region relates to connecting said external portable device to a separate close range communication interface of said plurality of close range communication interfaces;
transferring data via one of said plurality of close range communication interfaces to said portable device; and
generating measurement data based on said measurement signal and transferring said measurement data to said external portable device via one of said plurality of close range communication interfaces, wherein the measurement data comprises data related to a frequency response of the device under test.

10. The method according to claim 9, further comprising automatically transferring output data from the portable device to an external device, said output data being based on said data received from said measurement apparatus via one of said plurality of close range communication interfaces.

* * * * *